No. 617,343. Patented Jan. 10, 1899.
W. D. LEGG.
OIL FILTER.
(Application filed Apr. 21, 1898.)
(No Model.)
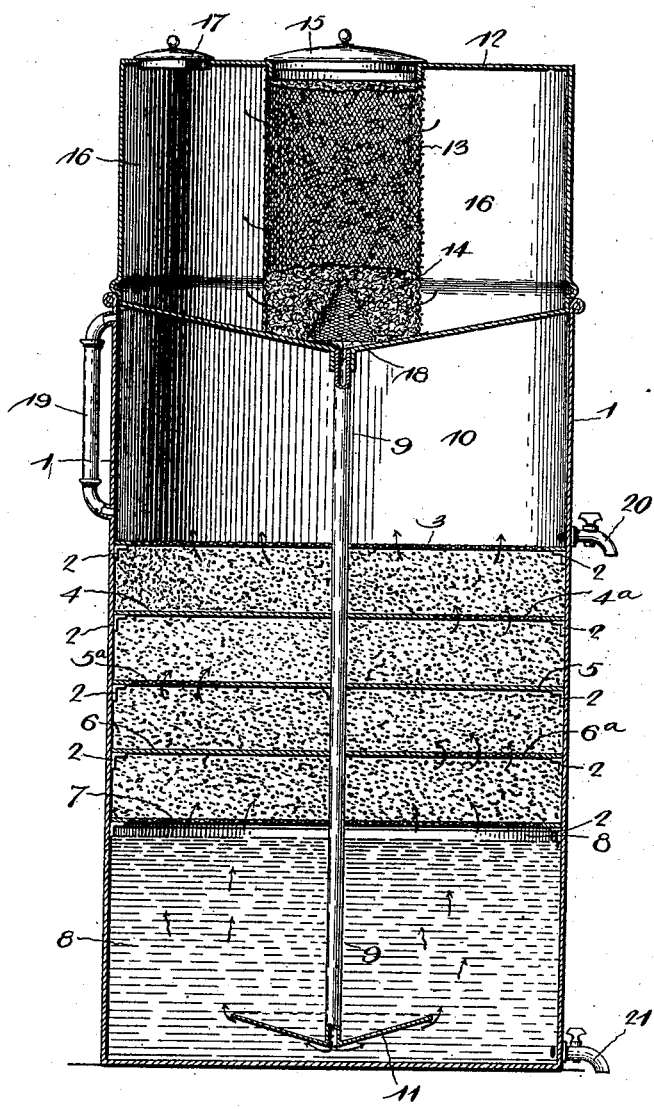
Witnesses
J. Srauff Culverwell,
William D. Legg, Inventor.
By his Attorneys,

UNITED STATES PATENT OFFICE.

WILLIAM D. LEGG, OF CLINTON, MISSOURI.

OIL-FILTER.

SPECIFICATION forming part of Letters Patent No. 617,343, dated January 10, 1899.

Application filed April 21, 1898. Serial No. 678,407. (No model.)

*To all whom it may concern:*

Be it known that I, WILLIAM D. LEGG, a citizen of the United States, residing at Clinton, in the county of Henry and State of Missouri, have invented a new and useful Oil-Filter, of which the following is a specification.

My invention relates to filters, and particularly to those designed for filtering oils; and the object in view is to provide a simple, compact, and efficient construction and arrangement of parts whereby the thorough filtering of the oil is attained and whereby the parts may be readily disconnected for cleansing purposes.

Further objects and advantages of this invention will appear in the following description, and the novel features thereof will be particularly pointed out in the appended claims.

In the drawing the figure represents a vertical central section of a filtering apparatus constructed in accordance with my invention.

1 designates a cylindrical receptacle provided with a series of interior brackets 2, arranged in different horizontal planes to support a series of filtering-disks numbered, respectively, 3, 4, 5, 6, and 7, the upper and lower disks 3 and 7 being perforated throughout, while the intermediate disks 4, 5, and 6 are provided with perforated outlets $4^a$, $5^a$, and $6^a$, which are staggered or arranged alternately contiguous to opposite sides of the casing or cylinder.

The space below the lowermost filtering-disk 7 forms a water-compartment 8, with which communicates the lower end of a feed-tube 9. The space above the uppermost filtering-disk constitutes an oil-chamber 10, to which the oil is admitted upwardly after passing through the water-compartment and the several filtering-disks, and the intervals between the adjacent filtering-disks form filtering-compartments which are filled with filtering material of a granular, fibrous, or other suitable quality or texture. The lower end of the feed-tube is provided with a deflector or spreader 11, which is upwardly and outwardly flared to conduct the oil outwardly from the tube, and thus insure the proper contact thereof with the contents of the water-compartment.

Removably seated in the upper end of the cylinder 1 is a hollow cover 12, divided interiorly by an annular concentric partition 13 to form a central filtering-compartment 14, fitted with a cap 15, and an annular surrounding receiving-compartment 16, into which oil to be filtered may be introduced through a capped opening. The upper extremity of the feed-tube 9 is threaded into the central opening in the floor of the filtering-compartment 14 and communicates with a perforated filtering-cone 18, carried by the bottom of said compartment 14.

With a construction as above described the oil to be filtered is placed in the receiving-compartment 16, from whence it passes through the perforated wall 13 into the central filtering-compartment 14, which is filled with any suitable filtering material adapted for the kind of oil which is to be treated. Thence passing downwardly through the perforated cone 18 and the feed-tube 9 the oil is discharged into the water-compartment 8 and rises through the contents of said compartment and successively through the filtering-disks and the filtering material arranged between the planes thereof to the filtered-oil compartment 10, the latter being provided with a transparent gage 19 and an outlet-faucet 20.

The construction as described is simple, and the parts may be readily disconnected and reassembled when it is necessary to cleanse the filtering mediums or make needed repairs. In order to disconnect the parts, the hollow cap should be elevated sufficiently to allow the operator to grasp the upper end of the feed-tube contiguous to the under side of the floor of the filtering-compartment 14. This feed-tube should then be unscrewed from its seat in the compartment 14, after which the cap may be displaced and the filtering-disks likewise successively removed from the cylinder. The reverse of the above operation results in the assembling of the parts in the positions hereinbefore described.

In addition to the faucet 20, which I have illustrated for drawing filtered oil, I also use a faucet 21, located near the bottom of the lower water-compartment 8, through which unfiltered or partly-filtered oil and water may be withdrawn from the interior of the receptacle for cleansing and analogous purposes.

Various changes in the form, proportion, and the minor details of construction may be resorted to without departing from the spirit or sacrificing any of the advantages of this invention.

Having described my invention, what I claim is—

1. A filter having a casing, a plurality of perforated filtering-disks arranged in different horizontal planes in the casing with interposed filtering material, the compartment below the lowermost disk being adapted for water and that above the uppermost disk for filtered oil, the disks being provided with staggered outlets arranged alternately at opposite sides of the casing, and oil-feeding devices communicating with the water-compartment near its bottom, substantially as specified.

2. A filter having its interior divided by horizontal spaced filtering-disks to form a series of compartments of which the lowermost is adapted for water and the uppermost for filtered oil, the uppermost and lowermost partitions being perforated throughout their surfaces, and the intermediate partitions being provided with perforated outlets arranged alternately at opposite sides of the cylinder, and the intervals between said filtering-disks being filled with filtering material, and means for feeding oil, including a feed-tube extending downwardly through the filtering-disks and terminating contiguous to the bottom of the water-compartment, substantially as specified.

3. A filter having a cylindrical casing provided with interior upper and lower compartments, respectively, for filtered oil and water, and separated by a series of interposed filtering mediums, a feed-tube having its outlet end located contiguous to the bottom of the water-compartment, a hollow cap removably fitting the upper end of the cylinder and having a central filtering-compartment in communication with the upper end of said feed-tube, and a surrounding annular receiving-compartment separated from said filtering-compartment by a reticulated partition, substantially as specified.

4. A filter having a cylindrical casing provided with interior upper and lower compartments, respectively, for filtered oil and water, and separated by a series of interposed filtering mediums, a feed-tube having its outlet end located contiguous to the bottom of the water-compartment, a hollow cap removably fitted in the upper end of the cylinder and divided by an interior concentric reticulated partition to form a central filtering-compartment and a surrounding receiving-compartment, the bottom of the filtering-compartment being provided with a threaded opening for detachable engagement with the upper end of the said feed-tube, and a perforated cone arranged in said filtering-compartment over the opening in which the upper end of the feed-tube is fitted, substantially as specified.

In testimony that I claim the foregoing as my own I have hereto affixed my signature in the presence of two witnesses.

WILLIAM D. LEGG.

Witnesses:
SAMUEL A. MILTON,
POLK QUARLES.